United States Patent [19]

Iwabuchi et al.

[11] Patent Number: 4,846,695
[45] Date of Patent: Jul. 11, 1989

[54] BUS BAR CONNECTOR

[75] Inventors: Osamu Iwabuchi; Hiroyuki Hama, both of Amagasaki, Japan

[73] Assignee: Mitsubishi Denki Kabushiki Kaisha, Tokyo, Japan

[21] Appl. No.: 262,307

[22] Filed: Oct. 25, 1988

[30] Foreign Application Priority Data

Oct. 26, 1987 [JP] Japan .................... 62-271167

[51] Int. Cl.$^4$ .................... F16C 21/00; H01R 4/00
[52] U.S. Cl. .................... 439/17; 439/115; 439/213; 439/246
[58] Field of Search ............ 439/13, 17, 19, 110, 439/115, 210; 384/101, 102; 403/26

[56] References Cited

U.S. PATENT DOCUMENTS 3,642,331  2/1972  Silver .................... 384/102
4,394,091  7/1983  Klomp .................... 384/101
4,468,070  8/1984  Yasuoka .................... 439/13

FOREIGN PATENT DOCUMENTS 59-169531  11/1984  Japan .
60-46604   10/1985  Japan .

*Primary Examiner*—Gary F. Paumen
*Attorney, Agent, or Firm*—Oblon, Spivak, McClelland, Maier & Neustadt

[57] ABSTRACT

In a bus bar connector, a ball bearing (20) having an inner wheel (21), an outer wheel (22) and plural balls (23) is provided between a guide rod (7) and a guide hole (3b) of the bus bar (3). When the center of gravity of the bus bar (3) is moved by electromagnetic force due to accidental overcurrent, a torque generated by friction force acting between the guide rod (7) and the inner wheel (22) rotates only the inner wheel (22) and is not conveyed to the bus bar (3).

1 Claim, 8 Drawing Sheets

BUS BAR CONNECTOR

FIELD OF THE INVENTION AND RELATED ART STATEMENT

1. Field of the invention

The present invention relates to a bus bar connector and especially relates to an improvement of a bus bar connector of a bus line system to be used in an electric power plant or a transformer station.

2. Description of the Related Art

Figure 4A:
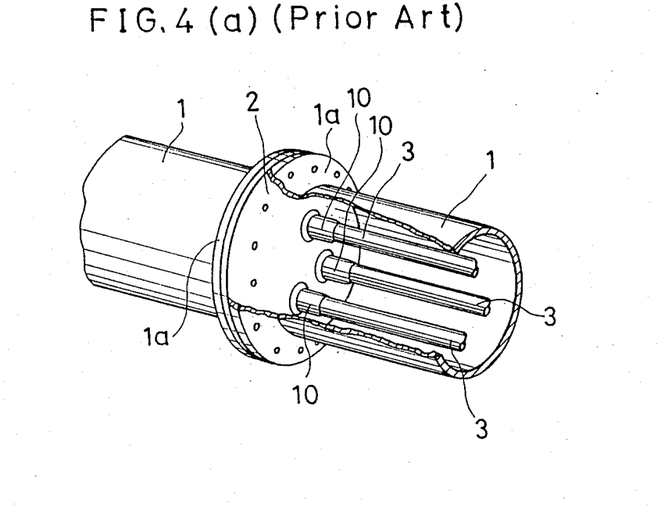
FIG. 4(a) is a partially broken perspective view showing a conventional bus line system.
Figure 4B:
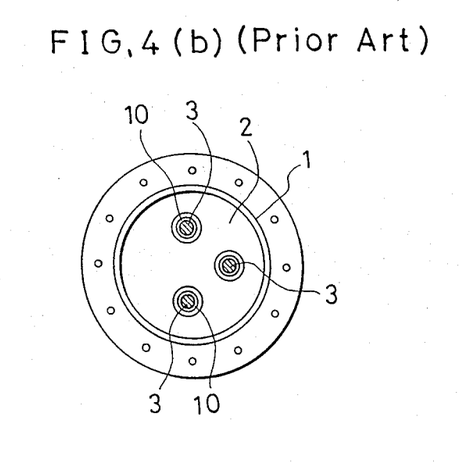
FIG. 4(b) is a cross-sectional side view on a plane vertical to the axis of the earthed vessel 1 of the bus line system shown in FIG. 4(a).

A conventional bus line system, for example, shown in Japanese published examined patent application no. Sho 60-46604 is shown in FIG. 4(a) and FIG. 4(b). And a conventional bus bar connector, for example, shown in Japanese published unexamined Utility model application No. Sho 59-169531 is shown in FIG. 5(a) and FIG. 5(b).

FIG. 4(a) is a partially broken perspective view showing a conventional gas insulation bus line system. In FIG. 4(a), a cylindrical grounded vessel 1 seals an insulation gas such as $SF_6$ as an insulation medium. An insulating gas spacer 2 is sandwiched at its periphery by flange parts 1a of the grounded vessels 1 from both sides. In the grounded vessel 1, three bus bars 3 are supported in the axial direction of the grounded vessel 1 by bus bar connectors 10 which are mounted on the insulating spacer 2. The bus bars 3 respectively serve as electric power lines of three-phase alternating current.

FIG. 4(b) is a cross-sectional view in a vertical plane against the axis of the grounded vessel 1. In FIG. 4(b), the bus bars 3 are respectively disposed on positions corresponding to apexes of a triangle.

Figure 5A:
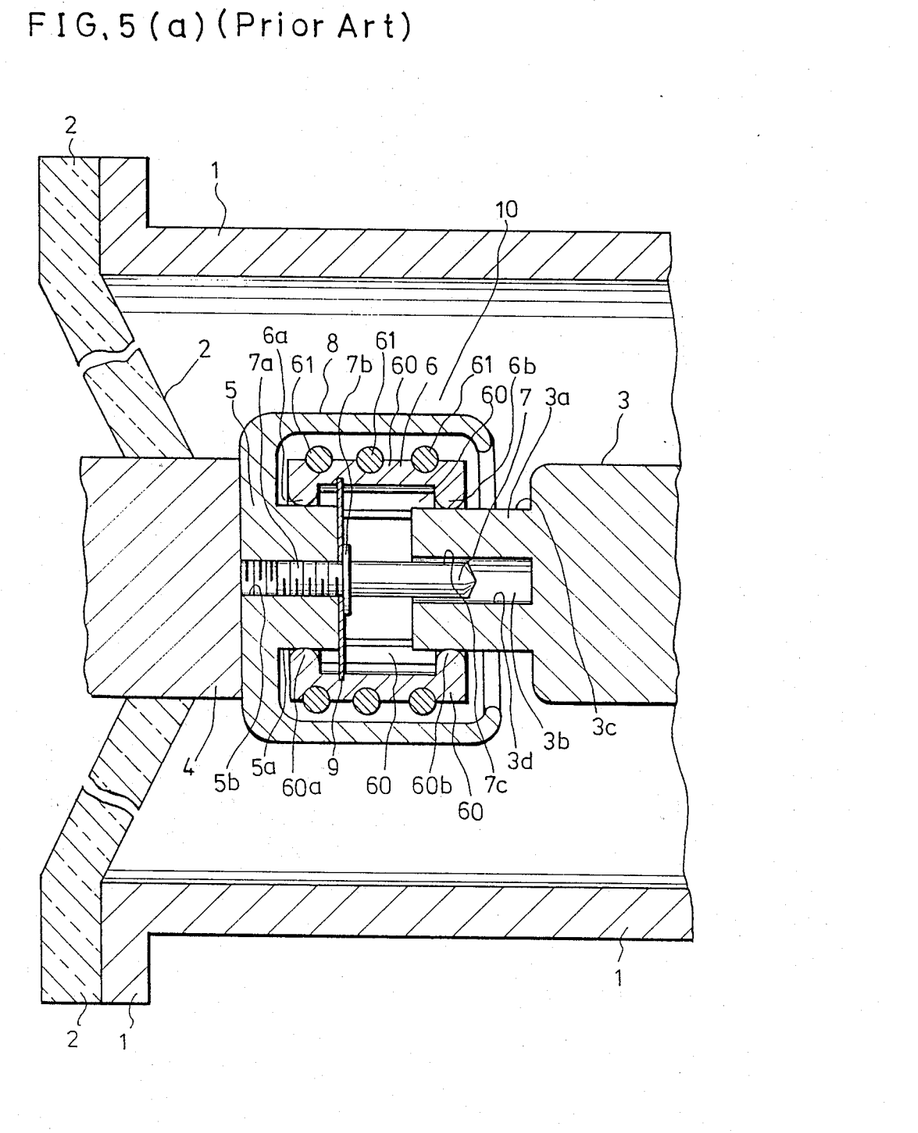
FIG. 5(a) is a cross-sectional top view showing a conventional bus bar connector.
Figure 5B:
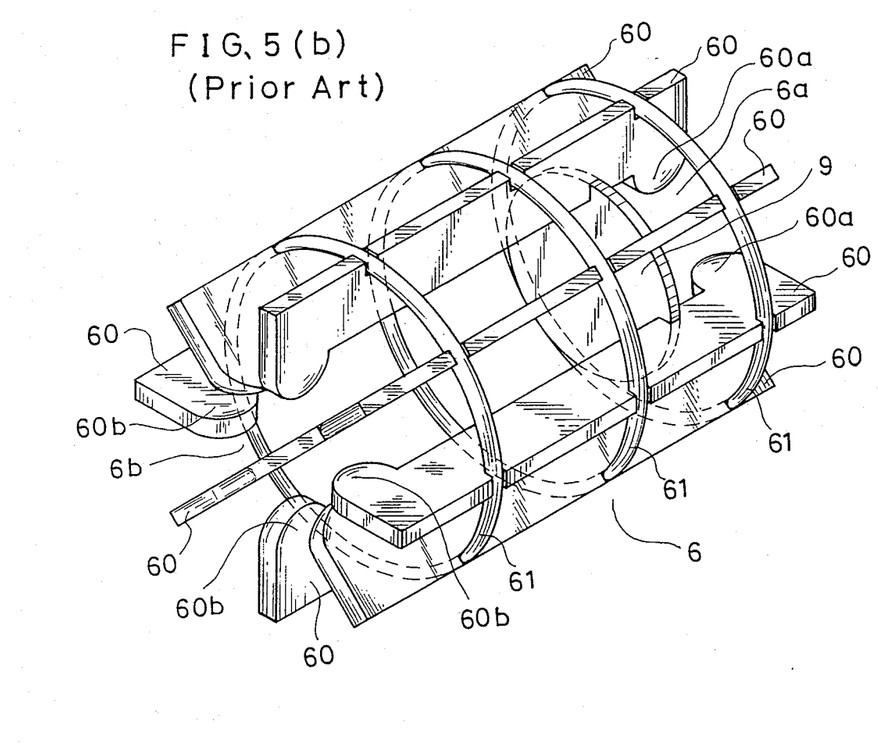
FIG. 5(b) is a perspective view showing a conventional tulip contact 6.

FIG. 5(a) is a cross-sectional top view showing details of the bus bar connector 10 for connecting the bus bar 3 to a conductor 4 in the insulating spacer 2. The conventional bus bar connector 10 consists of a fixed contact 5, a tulip contact 6, a guide rod 7, a shield 8 and a guide plate 9. The conductor 4 is provided in the insulating spacer 2 formed by cast molding. The fixed contact 5 having an offset part 5a and a center female screw 5b is fixed on the conductor 4. The guide rod 7 having a male screw part 7a is screwed into the center female screw 5b of the fixed contact 5. The guide plate 9 is fixed on the fixed contact 5 by sandwiching by a flange part 7b of the guide rod 7.

The tulip contact 6 has a cylindrical shape, for example, as shown in FIG. 5(b). FIG5(b) is a perspective view showing details of the tulip contact 6. In FIG. 5(b), the tulip contact 6 consists of plural thin plates 60, 60 . . . which are disposed on planes containing the axis of the guide rod 7 and garter springs 61 for binding the thin plates 60. Cylindricality of the tulip contact 6 is maintained by the guide plate 9. Each of the thin plates 60 has contacting parts 60a and 60b. The contacting parts 60a of the cylindrically bound thin plates 60 contact the outer cylindrical surface of the offset part 5a of the fixed contact 5 as shown in FIG. 5(a). The contacting parts 60b of the circularly bound thin plates 60 (hereinafter abbreviated as contacting part 6b of the tulip contact 6) contact the bus bar 3. Namely, the tulip contact 6 can not slide in the axial direction of the grounded vessel 1 or the guide rod 7 but has flexibility for fitting the movement of the bus bar 3.

The shield 8 is formed around the fixed contact 5 for enclosing the tulip contact 6.

The bus bar 3 has offset parts 3a for contacting the tulip contact 6 and center guide holes 3b for engaging the guide rod 7 on both end parts thereof as shown in FIG. 5(a). The contacting part 6b of the tulip contact 6 contacts on outer surface 3c of the offset part 3a of the bus bar 3. As the guide rod 7 engages the center guide hole 3b of the bus bar 3, the deformation of the tulip contact 6 is governed by the interference of an inside wall 3d of the center guide hole 3b of the bus bar 3 and an outer surface 7c of the guide rod 7 when the bus bar 3 is warped by receiving the gravity and/or electromagnetic force.

In the above-mentioned bus line system, the bus bar 3 serves an an electric power line on which high-voltage electric current is to flow. The electric current conducted from another bus bar which is supported in another grounded vessel, flows to the bus bar 3 passing through the conductor 4, the fixed contact 5 and the tulip contact 6. Furthermore, the electric current flows to still other bus bars while passing through other bus bar connectors disposed on the other end of the grounded vessel 1 (not shown in the figure).

In the normal condition of the bus line system, the electric currents which flow through respective bus bars 3 of three-phase electric power lines are not so large and do not generate large electromagnetic forces interacting between respective bus bars 3. Therefore, the bus bars 3 are not warped so much. As a result, the inner surfaces 3d of the center guide holes 3b of the bus bars 3 do not touch the outer surfaces 7c of the guide rods 7.

On the other hand, in abnormal conditions when a large over-current such as a shortcircuited current which is more than ten times as large as the current in the normal condition flows through at least one of the bus bars 3, the bus bars 3 are warped by electromagnetic forces interacting among themselves. And also the tulip contact 6 is deformed by the offset part 3a of the bus bar 3 and the deformation of the tulip contact 6 is limited only by the interference of the guide rod 7 and the center guide hole 3b of the bus bar 3.

Figure 6:
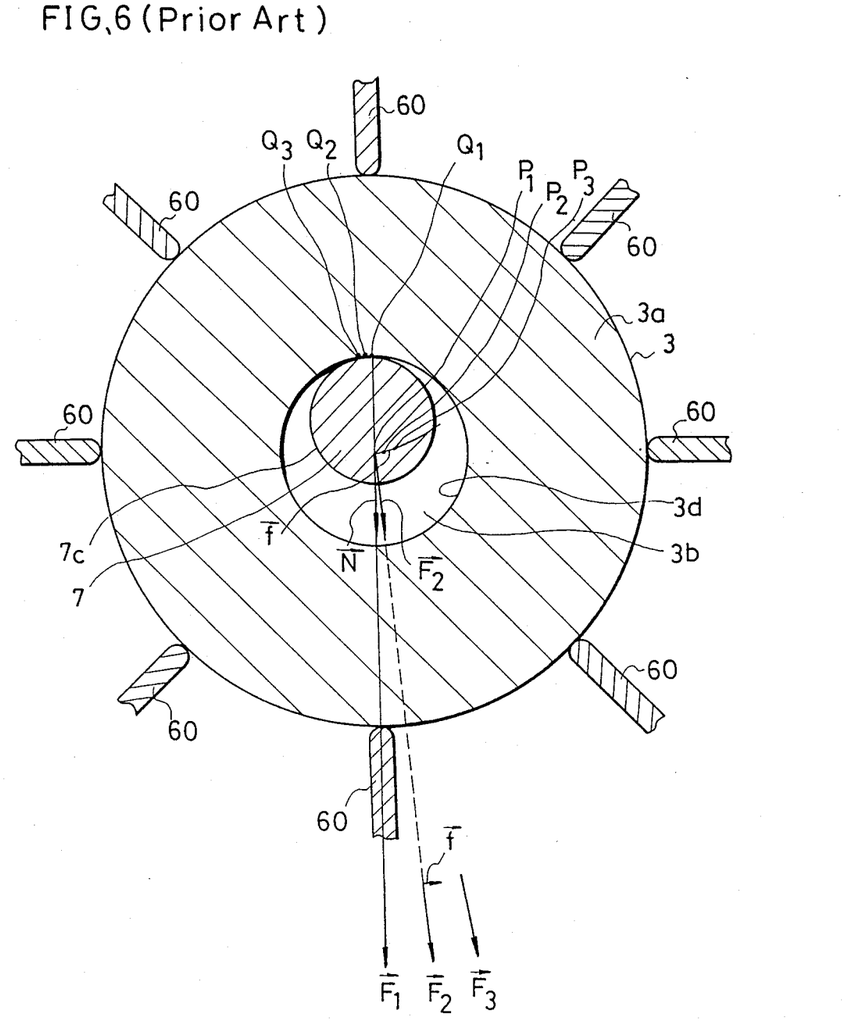
FIG. 6 is a cross-sectional view on a plane vertical to the axis of the earthed vessel 1 showing details of the interference of the guide rod 7 and the guide hole 3b of the bus bar 3 in the conventional bus bar connector.

FIG. 6 is a vertical cross-sectional view in a transverse direction to the axis of the guide rod 7 for showing a phenomenon of rotation of bus bar 3. Since the electromagnetic force acts on every part of the bus bar 3 in substantial uniformity, it is considered that the electromagnetic force acts on the center of gravity of the bus bar 3.

In FIG. 6, the electromagnetic force, at first, acts on the bus bar 3 in vertically downward direction shown by vector $\vec{F_1}$. At this time, the gravity $\vec{N}$ also acts on the center of gravity of the bus bar 3. As a result, the bus bar 3 and the center guide rod 7 touch each other at point $Q_1$.

When the electromagnetic force rotates in counterclockwise direction and acts on the center of gravity $P_1$ of the bus bar 3 as shown by vector $\vec{F_2}$, the horizontal component $\vec{f}$ of the electromagnetic force $\vec{F_2}$ acts on the center of gravity of the bus bar 3, to move the bus bar 3 in a horizontal right direction. However, when the friction force on the contacting point $Q_1$ surpasses the horizontal component $\vec{f}$ of the electromagnetic force $\vec{F_2}$, a small contacting part 3e of the bus bar 3 (shown in FIG. 7) can not move at all. Therefore, the horizontal component $\vec{f}$ induces a torque around the small part 3e, and the center of the gravity of the bus bar 3 rotates from the point $P_1$ to point $P_2$ in counterclockwise direction around the contacting point $Q_1$. When the center of gravity of the bus bar 3 rotates, the contacting point Q between the guide rod 7 and the center guide hole 3b of the bus bar 3 also relatively moves to point $Q_2$.

When the electromagnetic force further rotates in counterclockwise direction as shown by vector $\vec{F_3}$, the center of the gravity of the bus bar 3 rotates from the point $P_2$ to point $P_3$ in counterclockwise direction around the contacting point $Q_2$. At the same time, the contacting point $Q_2$ between the guide rod 7 and the center guide hole 3b of the bus bar 3 also moves to point $Q_3$.

Thus, the center of gravity of the bus bar 3 macroscopically moves on a circular locus. Actual displacement of the center of the gravity of the bus bar 3 is about 1–2 mm.

Figure 7:
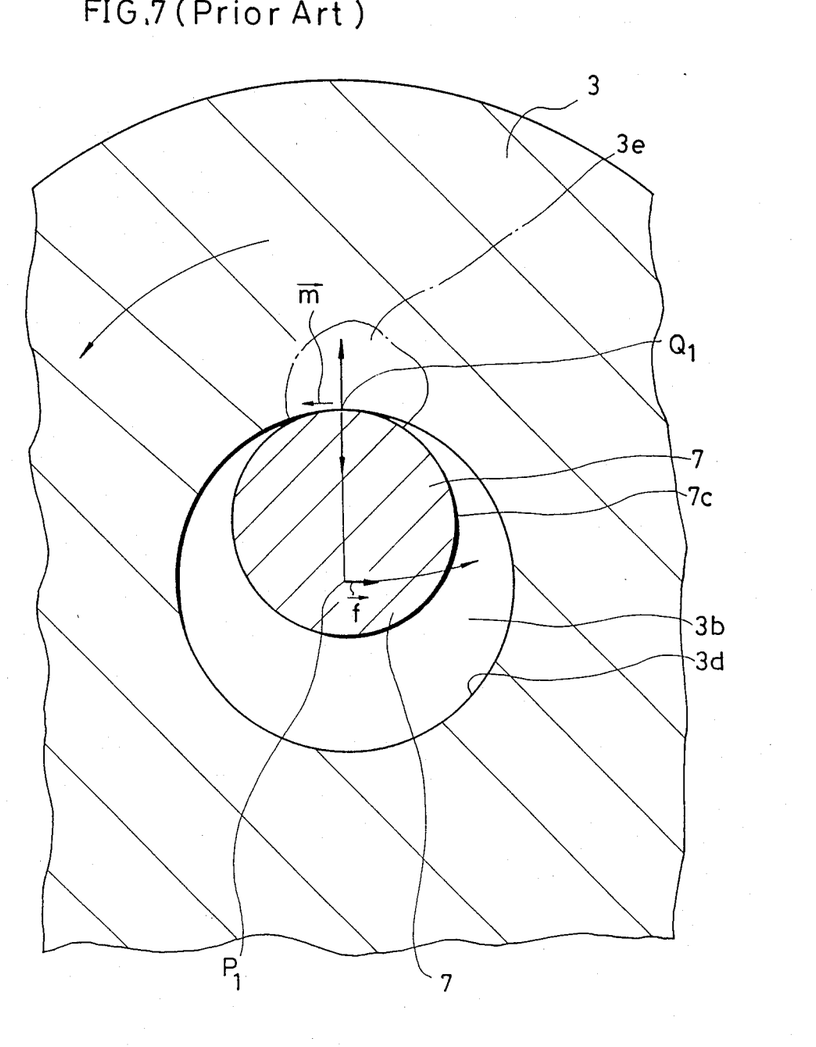
FIG. 7 is an enlarged cross-sectional view on a plane vertical to the axis of the earthed vessel 1 showing details of the contacting part of the guide rod 7 and the guide hole 3b of the bus bar 3 in the conventional bus bar connector.

Next, a phenomenon that the bus bar 3 rotates around the center of gravity thereof is described in the following. FIG. 7 is an enlarged cross-sectional view showing contacting part of the guide rod 7 with the center guide hole 3b of the bus bar 3.

As mentioned above, the center of gravity of the bus bar 3 microscopically moves in the right hand direction. Therefore, it is considered that the part 3e of the bus bar 3 around the contacting point $Q_1$ relatively receives a left-hand friction force $\vec{m}$. Apart from the aforementioned electromagnetic force $\vec{F}$ which acts on the center of gravity of the bus bar 3, the friction force $\vec{m}$ acts on the side wall of the center guide hole 3b of the bus bar 3 as a moment against the center of gravity $P_1$ of the bus bar 3. By such a torque, the bus bar 3 rotates around the center of the gravity thereof in counterclockwise direction.

The above-mentioned operation is summarized in that: (1) the center of gravity of the bus bar 3 rotates in a fixed direction corresponding to the rotation of the electromagnetic force; and (2) the bus bar 3 rotates around the center of gravity thereof in the same direction of the rotation of the electromagnetic force. Such a movement of the bus bar 3 can figuratively correspond to the revolution and the rotation of planet.

It is obvious from the above-mentioned description that the rotation of the bus bar 3 around the center of gravity thereof is caused by the friction force between the guide rod 7 and the center guide hole 3b of the bus bar 3. In the conventional constitution of the bus bar connector 10, the guide rod 7 and the bus bar 3 are respectively made of metal and the friction factor between them is about 0.1–0.3. Therefore, it is difficult to avoid a rotation phenomenon of the bus bar 3 around the center of the gravity thereof. By such a rotation of the bus bar 3, the slip phenomenon occurs between the outer surface of the offset part 3a of the bus bar 3 and the contacting part 6b of the tulip contact 6. Thereby, the conventional bus bar connector has disadvantages of adverse influences on current flow when an arc is induced therebetween and abnormal heating occurs due to the increase of contact resistance therebetween.

OBJECT AND SUMMARY OF THE INVENTION

The object of the present invention is to provide an improved bus bar connector in which the rotation of the bus bar around the center of gravity thereof can be suppressed.

A bus bar connector in accordance with the present invention comprises:

a bus bar having at least one contacting part and at least one guide hole formed in the end part of the contacting part;

a fixed contact fixed on a conductor which is mounted on an insulating spacer;

a guide rod fixedly mounted on the fixed contact to be engaged with the guide hole of the bus bar by insertion therein;

a tulip contact having flexibility for fitting the movement of the bus bar and coaxially mounted on the fixed contact around the guide rod for electrically connecting the contacting part of the bus bar to the fixed contact; and friction force reducing means provided between the guide rod and the guide hole of the bus bar, thereby to reduce friction force acting between the guide rod and the guide hole of the bus bar when the guide rod and the guide hole of the bus bar touch each other.

In such a bus bar connector, the friction force between the guide rod and the guide hole of the bus bar is reduced by the friction reducing means such as a ball bearing. Therefore, torque around the center of gravity of the bus bar is sufficiently reduced so as not to rotate the bus bar.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
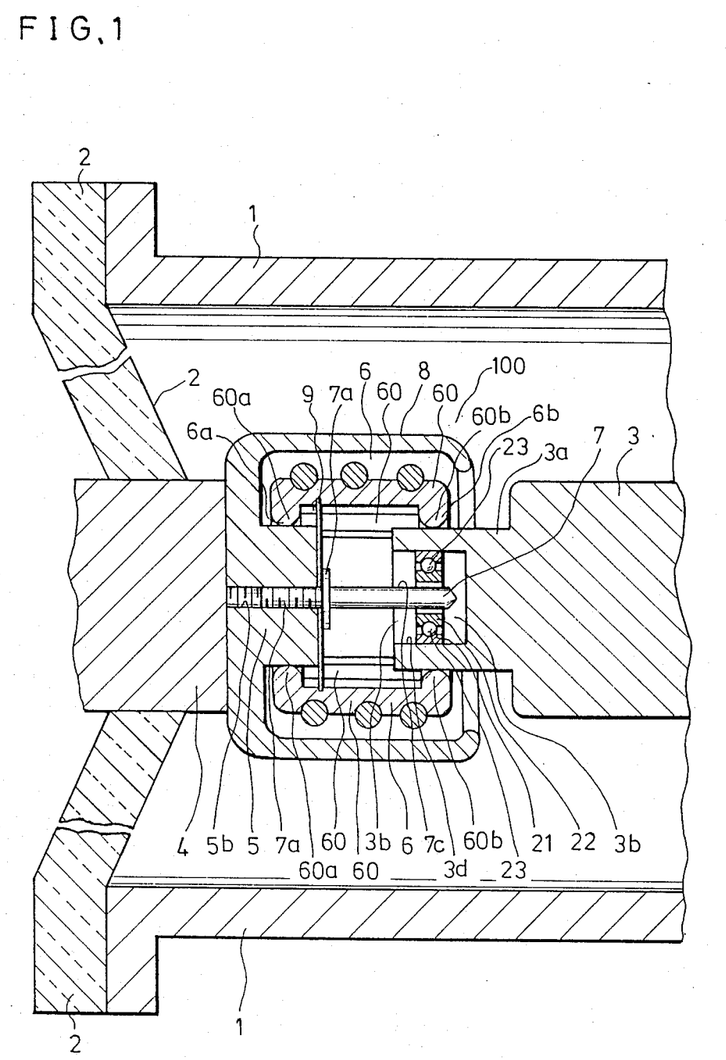
FIG. 1 is a cross-sectional top view showing details of a preferred embodiment of a bus bar connector in accordance with the present invention.

A preferred embodiment of a bus bar connector in accordance with the present invention is shown in FIG. 1.

The bus bar connector 100 of the present invention comprises, a fixed contact 5, a tulip contact 6, a guide rod 7, a shield 8, a guide plate 9 and a bearing 20.

A conductor 4 is provided in an insulating spacer 2 made by cast molding. The fixed contact 5 has an offset part 5a and a center female screw 5b, and is fixed on the conductor 4. The guide rod 7 has a male screw part 7a and a flange part 7b, and the male screw part 7a is screwed into the center female screw 5b of the fixed contact 5. The guide plate 9 is fixed on the fixed contact 5 by the sandwiching by the flange part 7b of guide rod 7. The tulip contact 6 consists of plural thin plates 60, 60 ... which are disposed on planes containing the axis of the guide rod 7 and garter springs 61 for binding the thin plates 60, the same as or similar to the conventional one as shown in FIG. 5(b). Cylindricality of the tulip contact 6 is maintained by the guide plate 9. Each of the thin plates 60 has contacting parts 60a and 60b. The contacting parts 60a of the cylindrically bound thin plates 60 contact the outer cylindrical surface of the offset part 5a of the fixed contact 5. The contacting parts 60b of the cylindrically bound thin plates 60 (hereinafter abbreviated as contacting part 6b of the tulip contact 6) contact the bus bar 3. Namely, the tulip contact 6 can not slide in axial direction of the grounded vessel 1 or the guide rod 7 but has a flexibility for fitting the movement of the bus bar 3.

The shield 8 is formed around the fixed contact 5 for enclosing the tulip contact 6.

The bus bar 3 has offset parts 3a for contacting the tulip contact 6 and center guide holes 3b for engaging the guide rod 7 on both end parts thereof. The contacting part 6b of the tulip contact 6 contacts an outer surface 3c of the offset part 3a of the bus bar 3.

Figure 2:
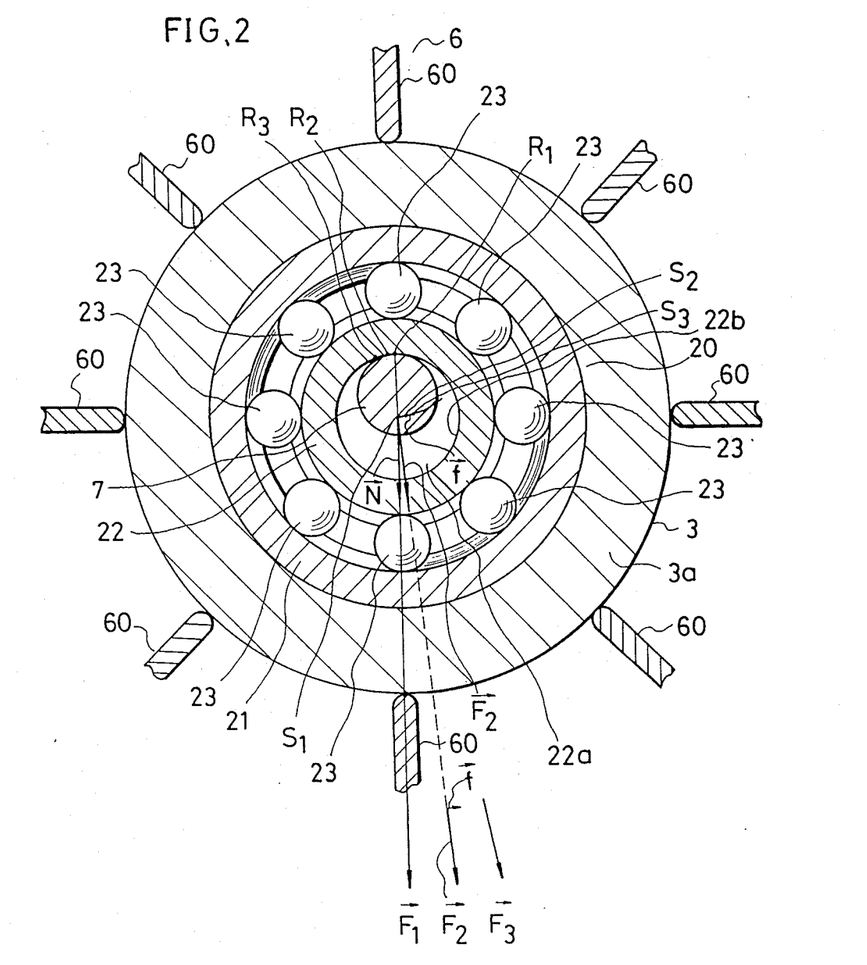
FIG. 2 is a cross-sectional view on a plane vertical to the axis of a guide rod 7 for showing details of interference of a guide rod 7 and a bearing 20 engaged in the guide hole 3b of a bus bar 3.

The bearing 20 is provided between the guide rod 7 and center guide hole 3b of the bus bar 3. The bearing 20 comprises an outer wheel 21, an inner wheel 22 and circularly disposed balls 23. The outer wheel 21 engages with the center guide hole 3b of the bus bar 3 as shown in FIG. 2. The guide rod 7 is engaged with an inside hole 22a of the inner wheel 22. Therefore, the deformation of the tulip contact 6 is governed by the interference of the inside hole 22a of the inner wheel 22 and an outer surface 7c of the guide rod 7 at the time of warping of the bus bar 3 by gravity or an electromagnetic force between the respective AC power lines.

Action of the guide rod 7, the bearing 20 and the bus bar 3 when large overcurrent such as shortcircuited current flows is described in the following: FIG. 2 is a cross-sectional view on a vertical plane transverse to the axis of the guide rod 7 showing details of the interference of a guide rod 7 and the bearing 20 which is engaged in the guide hole 3b of the bus bar 3. The bearing 20 is fit into the center guide hole 3b of the bus bar 3 and the guide rod 7 is engaged with the inside hole 22b of the inner wheel 22 of the bearing 20. The outer surface of the offset part 3a of the bus bar 3 contacts the tulip contact 5 and is supported by pressures acting on radial direction thereof by the garter springs 61.

In the figure, the electromagnetic force acts at first in a vertically downward direction shown by vector $\vec{F_1}$ and rotates in counterclockwise direction as shown by vectors $\vec{F_2}$ and $\vec{F_3}$. Since the electromagnetic force acts on every part of the bus bar 3 substantially uniformly, it is considered that the electromagnetic force acts on the center of gravity of the bus bar 3 and the bearing 20. At this time, the gravity $\vec{N}$ also acts on the center of gravity of the bus bar 3 and the bearing 20. Therefore, the bus bar 3 is warped and the outer surface 7c of the guide rod 7 and the inner surface 22b of the inner wheel 22 of the bearing 20 touch each other at point $R_1$.

When the electromagnetic force rotates in counterclockwise direction and acts on the center of gravity $S_1$ of the bus bar 3 and the bearing 20 as shown by vector $\vec{F_2}$, the horizontal component $f$ of the electromagnetic force $\vec{F_2}$ acts as torque and the center of gravity $S_1$ of the bus bar 3 and the bearing 20 rotates to point $S_2$ in counterclockwise direction around the contacting point $R_1$. When the center of gravity of the bus bar 3 and the bearing 20 rotates, the contacting point $R_1$ between the guide rod 7 and the inner wheel 22 of the bearing 20 also relatively moves to point $R_2$.

When the electromagnetic force further rotates in counterclockwise direction as shown by vector $\vec{F_3}$, the center of gravity of the bus bar 3 and the bearing 20 rotates from the point $S_2$ to a point $S_3$ in counter-clockwise direction around the contacting point $R_2$. At the same time, the contacting point $R_2$ between the guide rod 7 and the inner wheel 22 of the bearing 20 also relatively moves to point $R_3$.

Namely, the center of gravity of the bus bar 3 and the bearing 20 also moves on a circular locus like the conventional case. Such a movement like the revolution movement of the planet is inevitable.

Figure 3:
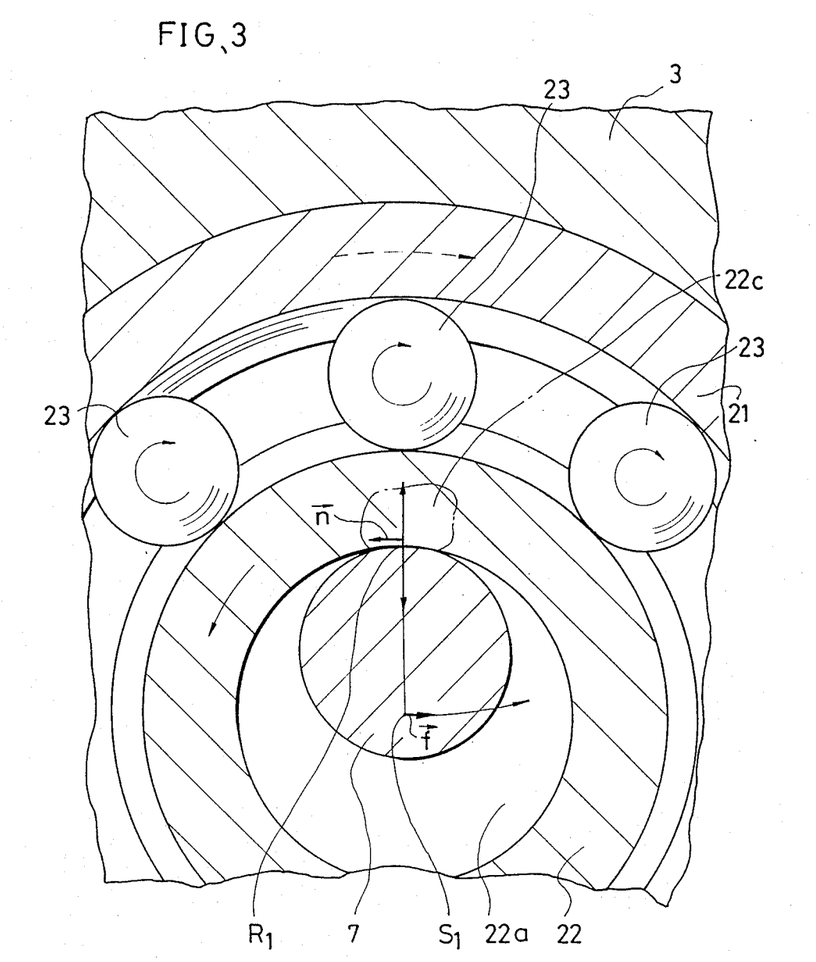
FIG. 3 is an enlarged cross-sectional view on the plane vertical to the axis of the earthed vessel 1 for showing details of the contacting part of the guide rod 7.

FIG. 3 shows enlarged contacting part of the guide rod 7 with the bearing 20. As the bus bar 3 and the bearing 20 rotate in the counterclockwise direction, it is considered that a part 22c of the inner wheel 22 of the bearing 20 nearby the contacting point $R_1$ receives a left-hand friction force $\vec{n}$. As a result, the inner wheel 22 rotates relatively in the counterclockwise direction around the center of gravity of the bus bar 3 and the bearing 20. Most of the friction force $\vec{n}$ is used for rotating the inner wheel 22; friction forces acting between the inner wheel 22 and the respective balls 23 are used for rotating the balls; and friction forces acting between the balls 23 and the outer wheel 21 are respectively very small. Any friction force acting between the tulip contact 6 and the bus bar 3 is larger than the total of the friction forces acting between the balls 23 and the outer wheel 21. Therefore, the friction force $\vec{n}$ acting as a torque for rotating the inner wheel 22 is hardly conveyed to the outer wheel 21. And as a result, the bus bar 3 hardly rotates.

As mentioned above, rotation of the inner wheel 22 is hardly transmitted to the outer wheel 21, and the torque for rotating the bus bar 3 around the center of the gravity thereof is reduced.

Apart from the above-mentioned embodiment, wherein the ball bearing 20 is used for reducing the friction force, materials having a low friction factor can be used for the guide rod 7 and the guide wall of the center guide hole 3b of the bus bar 3 for reducing the friction forces.

Although the invention has been described in this preferred form with a certain degree of particularity, it is understood that the present disclosure of the preferred form may be changed in the details of construction and the combination and arrangement of parts may be modified without departing from the spirit and the scope of the invention as hereinafter claimed.

What is claimed is

1. A bus bar connector comprising:
   a bus bar having at least one contacting part and at least one guide hole formed in an end part of said contacting part;
   a fixed contact fixed on a conductor which is mounted on an insulating spacer;

a guide rod fixedly mounted on said fixed contact to be engaged with said guide hole of said bus bar by insertion therein;

a tulip contact having flexibility for accommodating the movement of said bus bar and being coaxially mounted on said fixed contact around said guide rod for electrically connecting said contacting part of said bus bar to said fixed contact; and friction force reducing means provided between said guide rod and said guide hole of said bus bar to reduce friction force acting between said guide rod and said guide hole of said bus bar when said guide rod and said guide hole of said bus bar touch each other, wherein said friction reducing means is a ball bearing comprising an inner wheel having an inside hole, an outer wheel fitting in said guide hole of said bus bar, and plural balls circularly disposed between said inner wheel and said outer wheel, and wherein the diameter of said inside hole is larger than that of said guide rod.

* * * * *